United States Patent [19]

Matsushima et al.

[11] Patent Number: 5,085,910
[45] Date of Patent: Feb. 4, 1992

[54] OPTICAL DATA RECORDING MEDIUM AND METHOD OF MANUFACTURING THE SAME

[75] Inventors: Seiichi Matsushima, Tsukuba; Masahide Yagi, Toride; Masahiro Suzuki; Yasuyuki Mori, both of Ibaraki, all of Japan

[73] Assignee: Hitachi Maxell, Ltd., Osaka, Japan

[21] Appl. No.: 550,016

[22] Filed: Jul. 9, 1990

[30] Foreign Application Priority Data

Jul. 12, 1989 [JP] Japan .................. 1-178177

[51] Int. Cl.$^5$ .............................. B32B 3/02
[52] U.S. Cl. ....................... 428/64; 428/65; 428/409; 428/411.1; 428/426; 428/433; 428/457; 428/913; 369/272; 369/288; 346/762; 346/135.1; 430/945; 156/625; 427/164
[58] Field of Search ............. 428/64, 65, 409, 411.1, 428/426, 433, 457, 913; 369/272, 288; 346/76 L, 135.1; 430/945; 156/625; 427/164

[56] References Cited

FOREIGN PATENT DOCUMENTS 61-144740 7/1986 Japan .

OTHER PUBLICATIONS

CA 110 (12): 105111e, Optical recording Material, JP 63-160028, 7-2-88, TDK Corp.

CA 109 (2): 14881u, Antimony-germanium-Tin Alloy . . . , JP 62-246788, 10-27-87, Victor Co. of Japan Ltd.
Journal of Appl. Phys., vol. 62, No. 3, 8-1-87, pp. 1029-1034 Oxidation Resistance of Pb-Te-Se optical recording film, Moteyasu et al.

*Primary Examiner*—Patrick J. Ryan
*Attorney, Agent, or Firm*—Birch, Stewart, Kolasch & Birch

[57] ABSTRACT

Disclosed is an optical data recording medium provided with a glass substrate and a recording layer carried by the glass substrate, wherein the glass substrate is composed of a glass plate having a mixed layer of metallic tin or a tin compound formed on at least one surface thereof, a content of the metallic tin or tin compound on the surface of the glass substrate being regulated to 1.3 wt % or less and the entire surface of the glass plate being subject to a chemically reinforcing treatment, and also disclosed is a method of manufacturing an optical data recording medium provided with a glass substrate and a recording layer carried by the glass substrate, which comprises the steps of making a glass plate by a float method using melted metallic tin for the glass substrate, cutting the glass plate to a desired configuration and size, polishing at least one surface of the glass plate which is in contact with the melted metallic tin when making the glass plate to regulate a content of tin in the polished surface to 1.3 wt % or less, and subjecting the polished glass plate to a chemically reinforcing treatment.

12 Claims, 7 Drawing Sheets

OPTICAL DATA RECORDING MEDIUM AND METHOD OF MANUFACTURING THE SAME

FIELD OF THE INVENTION

The present invention relates to an optical data recording medium having a glass substrate and a method of manufacturing the same, and more specifically, to a material of the glass substrate and a method of processing the same.

BACKGROUND OF THE INVENTION

A material for substrate for an optical data recording medium has largely been glass or plastics, with a glass substrate having been used for an optical data recording medium such as optical disc memories for a computer which require high reliability, high recording density and long-term preservation. Glass is used because it has advantages in that: (1) it changes less with age in size and configuration caused by moisture absorption and the like; (2) it has less residual strain and thus double refraction does not arise; (3) it has excellent surface flatness and is difficult to be scratched; (4) it has high rigidity and thus is difficult to deformed; (5) it has excellent chemical and thermal durability; and (6) it can be accurately processed, and the like.

As disclosed, for example, in Japanese Patent Application Kokai (Laid-Open) No. 61-144740, a glass plate made by a so-called float method and subject to a chemically reinforcing treatment effected by such as an ion exchange method has been conventionally proposed as a glass plate for a glass substrate.

The glass plate made by the float method is characterized in that it is less expensive and has an excellent uniformity of thickness and flatness. Thus it is suitable as a glass substrate for optical data recording medium. In addition, the drawback of the glass plate in that it is fragile and liable to be broken is improved by the chemically reinforcing treatment.

By the way, since the float method is a method of making glass plates in such a manner that melted glass is flown onto the surface of melted metallic tin stored in a bath and moved in one direction, and semi-melted glass is stretched in the horizontal direction to enable the same to remove from the surface of the melted metallic tin and cooled, a mixed layer of metallic tin and a tin compound being formed on the surface (bottom surface) of the glass plate in contact with the surface of the melted metallic tin. On the other hand, the surface (top surface) of the glass plate which was not in contact with the melted metallic tin while it was made usually has not such a mixed layer formed thereon, but sometimes the mixed layer may be partially formed thereon because a vapor of the tin compound diffused in air is brought into contact with the glass plate. In any case, the mixed layer of the metallic tin and tin compound of high concentration is formed on the bottom surface of the glass plate rather than on the top surface thereof.

When the glass plate whose top surface and bottom surface have a different amount of the metallic tin and tin compound, as described above, is subject to the chemically reinforcing treatment by the ion exchange method in such a manner that it is dipped, for example, into a solution of potassium nitrate melted by being heated to a high temperature, the glass plate is warped. When, however, a glass plate not containing tin is dipped into the potassium nitrate solution as described above, it is not warped. This phenomenon of warping is considered to be caused by the difference of a doped amount of substituted ions on the upper and lower surfaces of the glass plate containing tin. More specifically, the chemically reinforcing treatment of the glass plate by the ion exchange method reinforces the glass plate in such a manner that alkali ions (for example, sodium ions) contained in the glass plate are substituted by other alkali ions (for example, potassium ions) having a diameter larger than that of the alkali ions contained in the glass plate to cause compression stress to remain on the surface of the glass plate. Thus, when the mixed layer of the metallic tin and tin compound is formed on the surface of the glass plate, tin atoms prevent the invasion of the substitution ions to result that a doped amount of a substituted ions (for example, potassium ion) in the surface of the glass plate where a larger amount of the tin is contained is made smaller than a doped amount of a substituted ions (for example, potassium ion) in the surface of the glass plate where a smaller amount of the tin is contained, whereby the above disadvantage is caused.

Since the above known example and prior art did not consider the problem in that the chemically reinforcing treatment is not uniformly effected due to the existence of the mixed layer at all, it has been difficult to make a glass substrate having a small amount of warping, and thus it has been difficult to make an optical data recording medium excellent in durability.

OBJECT AND SUMMARY OF THE INVENTION

The first object of the present invention is made to overcome the above drawback of the prior art, namely to provide a optical data recording medium having a less warped glass substrate, and the second object thereof is to provide a method of manufacturing such an optical data recording medium.

To achieve the above first object, the present invention is characterized in that an optical data recording medium provided with a glass substrate and a recording layer carried by the glass substrate, wherein the glass substrate is composed of a glass plate having a mixed layer of metallic tin or a tin compound formed on at least one surface thereof, a content of the metallic tin or tin compound on the surface of the glass substrate being regulated to 1.3 wt % or less and the entire surface of the glass plate being subject to a chemically reinforcing treatment.

Further, to achieve the above second object, the present invention is characterized in that a method of manufacturing an optical data recording medium provided with a glass substrate and a recording layer carried by the glass substrate, comprises the steps of making a glass plate by a float method using melted metallic tin for the glass substrate, cutting the glass plate to a desired configuration and size, polishing at least one surface of the glass plate which was in contact with the melted metallic tin when making the glass plate to regulate a content of tin in the polished surface to 1.3 wt % or less, and subjecting the polished glass plate to a chemically reinforcing treatment.

BRIEF DESCRIPTION OF THE DRAWINGS

All of the drawings show examples of the present invention, wherein.

Figure 1:
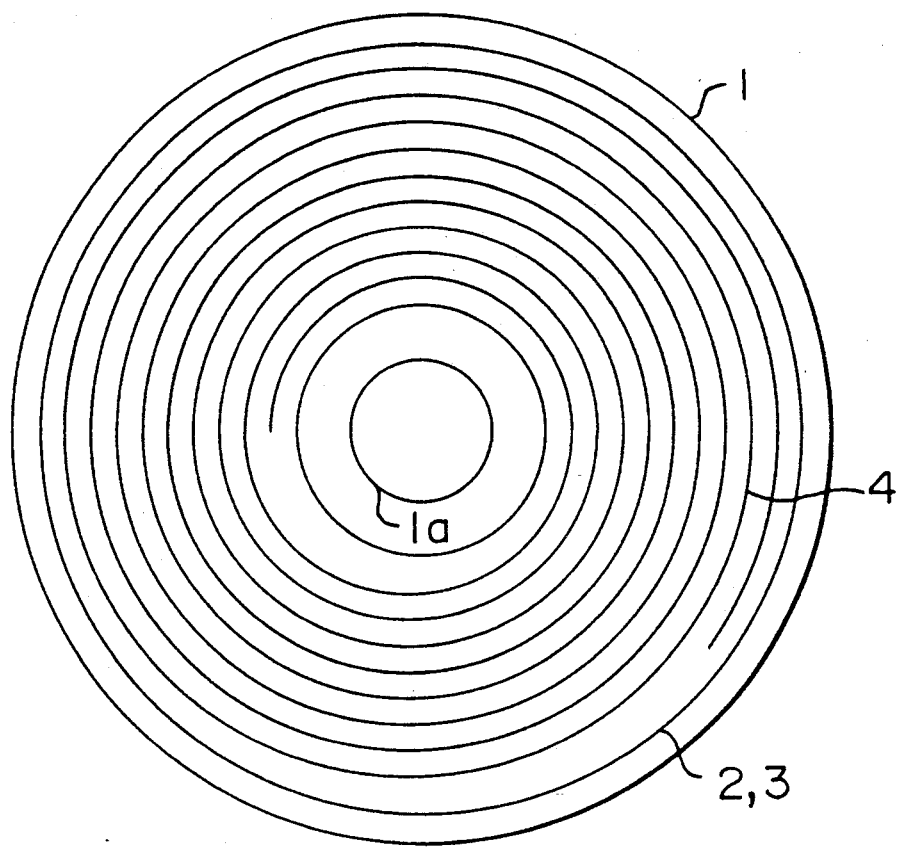
FIG. 1 is a plan view of an optical disc single plate.

The numbers in the drawings indicate the following. 1 ... glass substrate, 2 ... transfer layer, 3 ... recording layer, 4 ... preformat pattern, 6 ... protective layer, 7 ... void, 8 ... center hub, 9 ... adhesive layer

DETAILED DESCRIPTION OF PREFERRED EMBODIMENT

Figure 9:
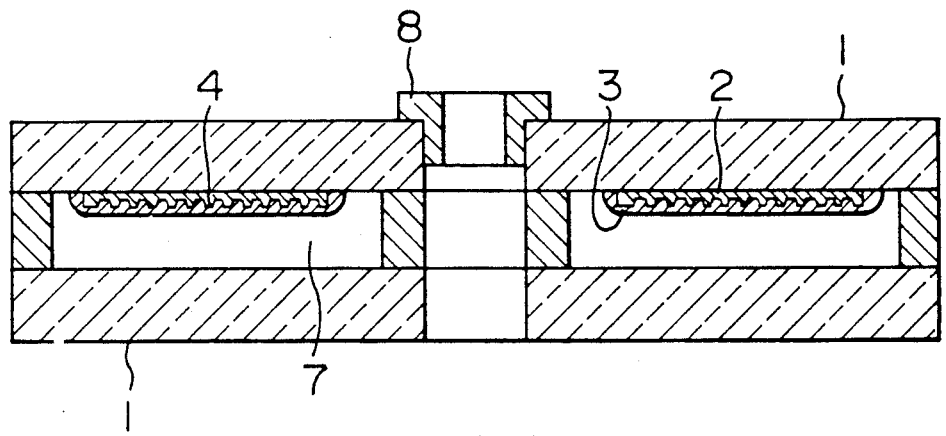
FIG. 9 is a cross sectional view of a further example of the optical disc single plate.

A preferred embodiment of the present invention comprises a recording layer 3 formed through a transfer layer 2 of a preformat pattern made of photo curing resin. As shown in FIG. 9, the preformat pattern may be directly etched on one side of a glass substrate 1 and the recording layer 3 may be formed on the surface of the glass substrate 1 where the preformat pattern 4 is formed.

Further, the preferred embodiments of the present invention are applicable to an optical disc and also applicable to other kinds of optical data recording mediums such as an optical card and the like.

Further, in the preferred embodiment of the present invention, since the optical disc has a glass substrate of an air sandwich structure or closely adhered structure, recording layers can be formed on both of two glass substrates. In addition, the recording layer may be formed on any one of the two glass substrates.

Since known technologies are applicable, as they are, to a method of making a float glass plate, a method of cutting the glass plate, a method of polishing the glass plate, and a chemically reinforcing treatment by an ion exchange method, the description thereof is omitted in this specification. In addition, a size, configuration and the like of the glass substrate 1 can be suitably selected from known ones.

Figure 10:
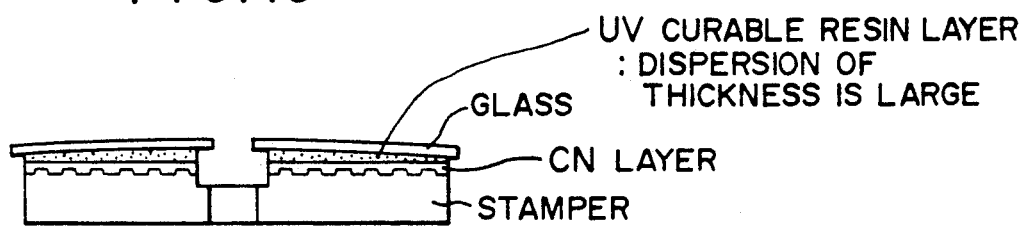
FIG. 10 shows the steps of the optical disc manufacturing process.

FIG. 10 shows the manufacturing processes from the formation of the transfer layer 2 of the preformat pattern to the manufacture of the an optical disc single plate. The solution of nitro cellulose resin is spread on a stamper and dried to form a film and then, the solution of the photo curing resin is spread on the nitro cellulose film with the glass plate and cured by the irradiation of UV rays, and then the nitro cellulose resin layer and the photo cured resin layer are peeled from the stamper. Therefore, the transfer layer 2 is made of the photo curing resin and the surface thereof in contact with the recording layer 3 has the desired preformat pattern 4 formed to a fine irregular shape. The preformat pattern 4 is composed of guide grooves for guiding a recording-/reproducing light and/or prepit trains on which signals are recorded in an irregular arrangement, and formed to a spiral or circular shape concentric with the center hole 1a defined at the center of the glass substrate 1, as shown in FIG. 1. The preformat pattern 4 is transferred to the transfer layer 2 by a so-called 2P method (photo curing resin method). Note that, although omitted in the figure, a silane coupling agent layer may be formed on the surface of the glass substrate 1 where the transfer layer is formed to improve the close adhesion property of the glass substrate 1 with the transfer layer 2.

The recording layer 3 can be formed using any known heat mode recording material such as a write once type, magneto-optical type, phase change type and the like. Although the recording layer 3 is shown as a single layer in FIG. 2, it may be formed of a laminated member composed of a plurality of thin films each made of a different material, as necessary.

No restriction is imposed on the surfaces of the glass plate 1 on which the transfer layer 2 and the recording layer 3 are formed.

As described above, various glass substrates 1 can be made by suitably selecting the surfaces thereof to be polished and suitably adjusting an amount of polishing.

Next, another example of the optical disc single plate according to the present invention will be described with reference to FIG. 5.

Figure 5:
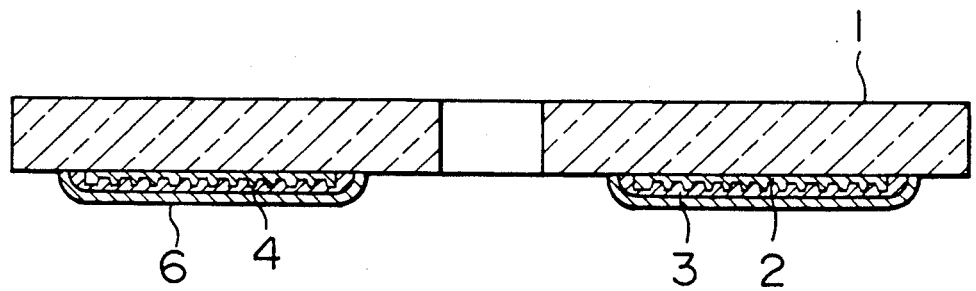
FIG. 5 is a cross sectional view of another example of the optical disc single plate.

FIG. 5 is a central cross sectional view of the optical disc single plate, wherein the transfer layer 2 of a preformat pattern is formed on one surface of a glass substrate 1, a recording layer 3 is deposited on the surface of the transfer layer 2, and a protective layer 6 is further coated on the surface of the recording layer 3.

The protective layer 6 protects the recording layer 3 from mechanical shock and chemical effect and can be made of, for example, a resin material such as photo curing resin and the like and an inorganic compound such as $SiO_2$, $TiN$, $Al_2O_3$ and the like. A suitable means for forming the protective layer 6 includes a spin coating for a resin protective layer and a vacuum film forming method such as sputtering for an inorganic protective layer.

Since the glass substrate 1, the transfer layer 2 and the recording layer 3 are the same as those of the above example, the description thereof is omitted. With respect to the optical disc single plate of this example, the surfaces of the glass substrate 1 on which the transfer layer 2, the recording layer 3 and the protective layer 6 are to be formed can be arbitrarily selected.

An experiment shows that there is a remarkable relationship between a position of depth of the mixed layer containing tin and/or a tin compound from the bottom surface of the glass plate and a content of the tin compound in the layer, and as a position of depth from the bottom surface of the glass plate is deeper, a content of the tin compound is proportionally lowered and a content of the tin compound is almost zero at the positions deeper than position of depth nearer the bottom surface of glass plate. In addition, there is a remarkable relationship between an amount of polishing of the bottom surface of the glass plate and an amount of warping of the chemically reinforced glass substrate made of the polished glass plate. As an amount of polishing is increased, the amount of warping of the glass substrate is proportionally lowered.

A relationship between the content of the tin compound included in the surface of the glass substrate and the amount of warping of the glass substrate can be determined from these data. It is found that the reduction in the content of the tin compound in the surface of the glass substrate enables an amount of warping of the glass substrate to be reduced.

Figure 11:
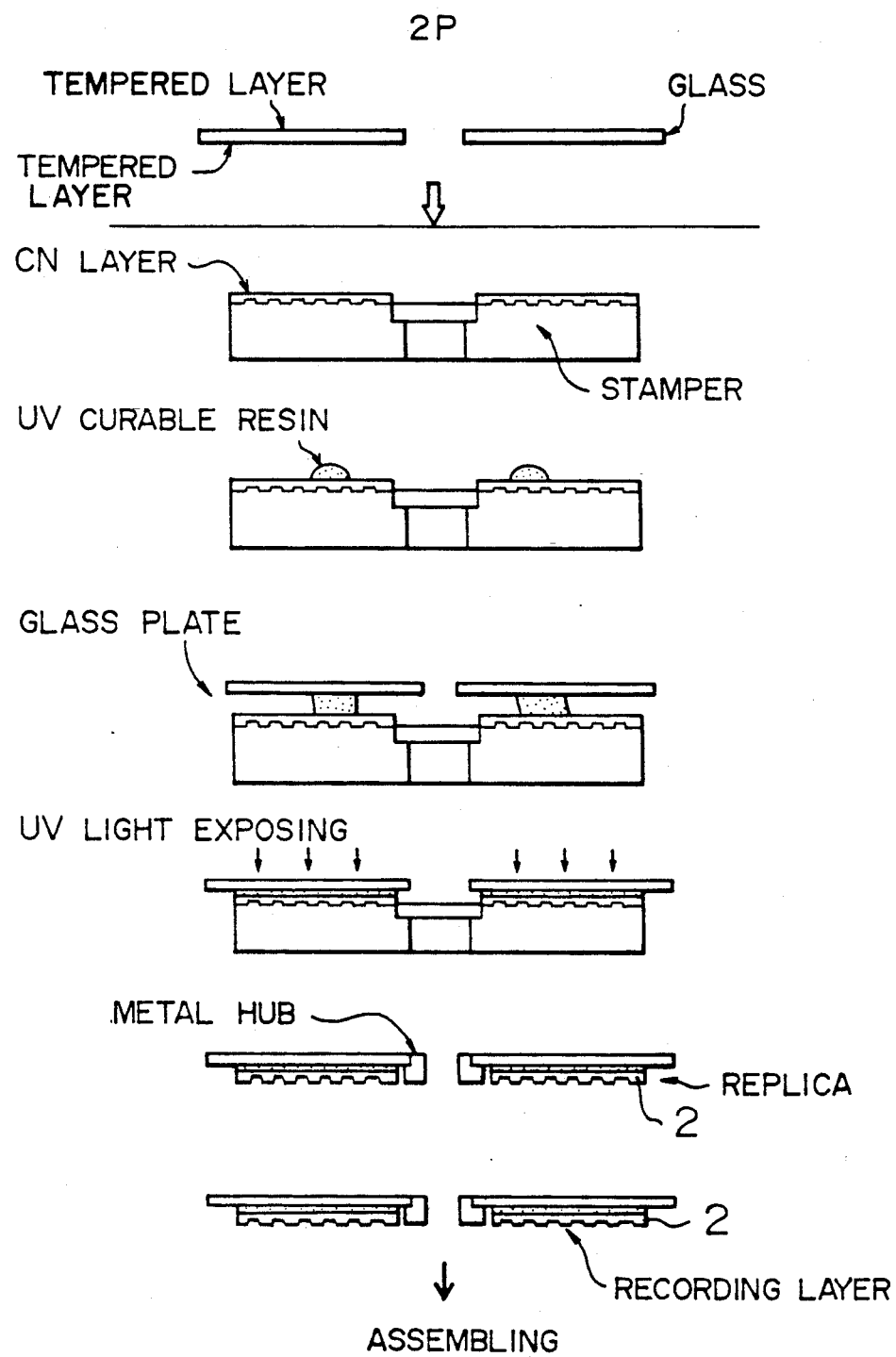
FIG. 11 is a cross sectional view of a glass substrate having a transfer layer on a stamper.

In general, when an optical data recording medium is made by the method shown in FIG. 10 using a warped glass substrate in such a manner that UV resin is spread on a stamper with a glass substrate and cured by the irradiation of UV rays to form a transfer layer, the UV resin between the warped glass plate and the stamper has a dispersed thickness, as shown in FIG. 11. As shown in Table 1, the range of the dispersion of the conventional warped glass is remarkably greater than that of the glass not warped according to the present invention.

TABLE 1

|  | Articles of the Present invention | Articles of Prior Art |
| --- | --- | --- |
| Thickness of a UV Resin (μm) | 65-75 | 40-100 |

In general, if an amount of warping of the glass substrate exceeds 0.20 mm, a crack is liable to arise when, for example, an optical data recording medium of an air sandwich structure or closely adhered structure is fabricated. The applicant of the present invention has found from the above experiment that an amount of warping of a glass substrate can be restricted to 0.20 mm or less by regulating a content of the metallic tin or tin compound to 1.3 wt % or less. This value is a percentage by weight of the tin or tin compound contained in a unit weight of the surface of the glass plate (for example, a weight of glass of 1 cm$^2$ × 1 micron meter thick).

Therefore, an optical data recording medium which is less warped and excellent in durability can be provided by taking the above mentioned means.

EXAMPLES

The examples of the present invention will be described with reference to an optical disc as an example.

(Example 1)

This example is related to a substrate according to the present invention.

Figure 2:
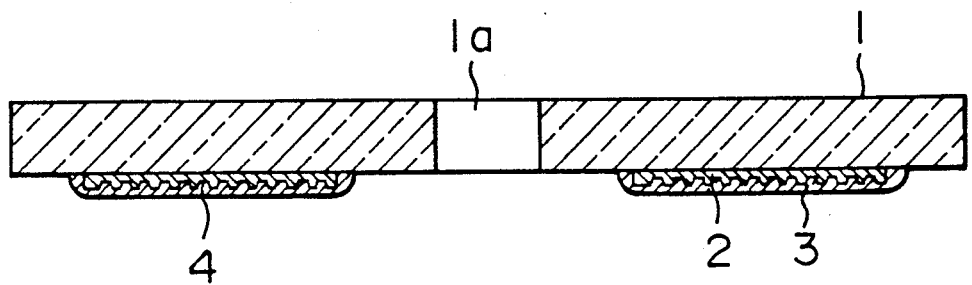
FIG. 2 is a cross sectional view of the optical disc single plate.

FIG. 1 is a plan view of an optical disc single plate as a source of various optical discs according to the present invention viewed from the surface thereof on which a recording layer is formed and FIG. 2 is a central cross sectional view of FIG. 1, wherein the transfer layer 2 of a preformat pattern is formed on one surface of a glass substrate 1 and the recording layer 3 is deposited on the surface of the transfer layer 2.

The glass substrate 1 is composed of a glass plate having a mixed layer of metallic tin or a tin compound formed on at least one surface thereof, a content of the metallic tin or tin compound on the surface of the glass substrate 1 being regulated to 1.3 wt % or less when represented by a percent by weight of the tin or tin compound contained in a unit weight of the surface of the glass plate (for example, a weight of glass of 1 cm$^2$ × 1 micron meter thick) and the entire surface of the glass plate being subject to a chemically reinforcing treatment by an ion exchange method.

The glass substrate 1 can be made in such a manner that a glass plate made by the above float method using the melted metallic tin is cut to a desired size and configuration, then at least one surface thereof which is in contact with the melted metallic tin is polished to regulate a content of tin in the polished surface to 1.3 % or less, and thereafter the polished glass plate is subject to the chemically reinforcing treatment by the ion exchange method. A washing process for removing polished powder and a washing process using inorganic acid for removing the metallic tin attached to the surface of the glass plate, and the like may be of course suitably combined in addition to the above processes.

Figure 3:
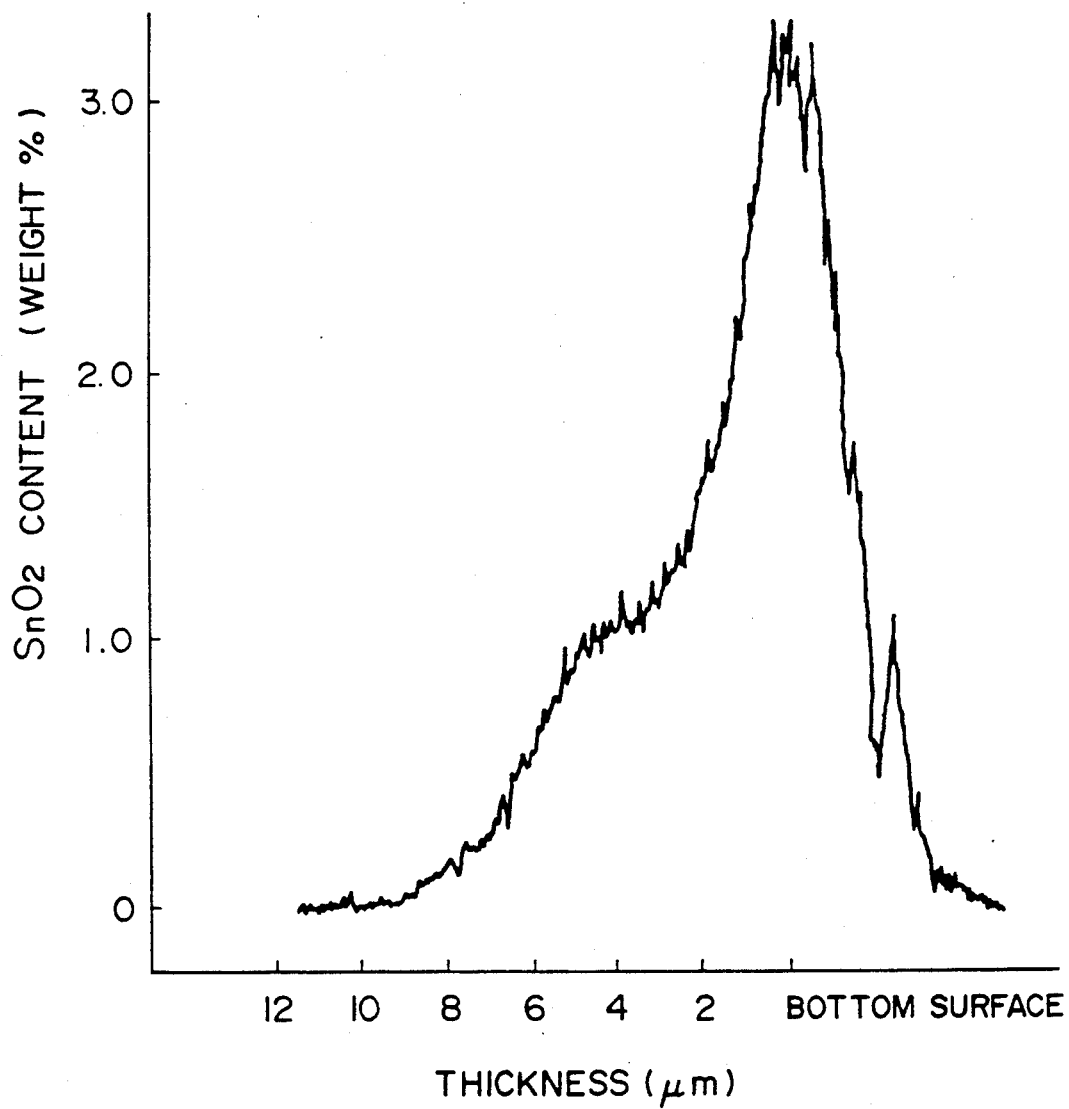
FIG. 3 is a graph showing a diffusion profile of a tin compound diffused in glass.

FIG. 3 shows a diffusion profile of the tin compound ($SnO_2$) diffused in a glass plate made by the float method, where the glass plate had a thickness of 1.1 mm and analyzed by an XMA (X-ray microanalizer).

As shown in the figure, the glass plate of this example has $SnO_2$ diffused to the thickness of about 12 micron meters from a bottom surface. An amount of diffusion of $SnO_2$ on the bottom surface is about 3.0 wt %, and as the depth from the bottom surface is larger, an amount of diffusion is gradually reduced.

As described above, the glass plate having a gradient of concentration of $SnO_2$ in the thickness direction is warped when it is subject to the chemically reinforcing treatment, because the effect of the treatment to the surface (bottom surface) having a high concentration of $SnO_2$ and that to the surface (top surface) having a low concentration of $SnO_2$ (for example, a dosage of potassium ions $K_2O$) are not balanced. A larger amount of warping causes a larger tensile strength applied to the glass substrate 1 when it is fabricated as an optical disc, which is liable to produce a crack. Therefore, a concentration of $SnO_2$ on the bottom surface must be lowered to reduce an amount of warping while sufficiently reinforcing the glass substrate.

Figure 4:
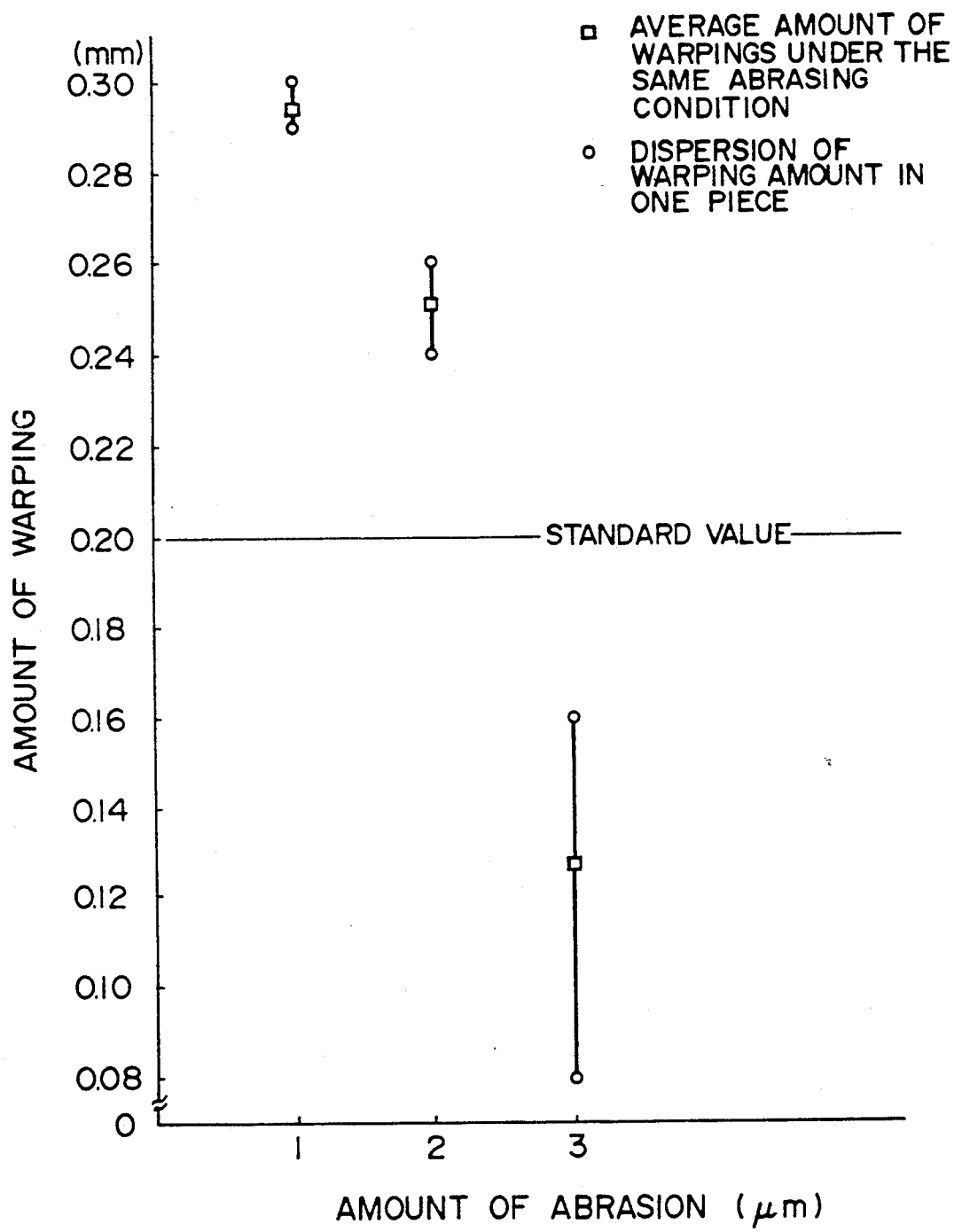
FIG. 4 is a graph showing the relationship between an amount of polishing of a bottom surface and an amount of warping of a polished glass plate when it is subject to a chemically reinforcing treatment.

FIG. 4 shows the relationship between an amount of polishing of the bottom surface of a glass plate and an amount of warping of a polished glass plate subjected to the chemically reinforcing treatment. As shown in the figure, when the bottom surface is polished by about 3 micron meters, an amount of warping thereof can be regulated to 0.20 mm or less. Note that a concentration of $SnO_2$ on the surface of the glass substrate is lowered to about 1.3 wt % at the same time (refer to FIG. 3), and thus it is found that a concentration of $SnO_2$ must be made to about 1.3 wt % or less to make an amount of warping of the glass substrate to 0.20 mm or less.

Note that the means for lowering the concentration of $SnO_2$ tin ions on the bottom surface includes a chemical or electrochemical elution treatment of tin in addition to the above polishing. This method can remove tin more effectively than the polishing, whereby a manufacturing cost of the glass substrate can be reduced.

(Example 2)

Various optical discs fabricated using the optical disc single plate of the example 1 will be described.

Figure 6:
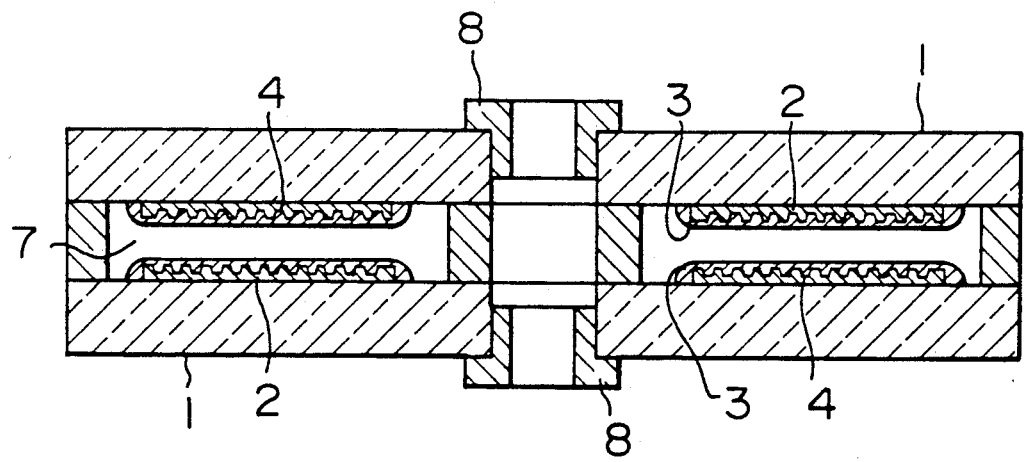
FIG. 6 is a cross sectional view of an optical disc having an air sandwich structure.

FIG. 6 shows an optical disc of a so-called air sandwich structure using the optical disc composed of a glass substrate provided with a mixed layer in which the metallic tin or tin compound is mixed. The optical disc comprises the two optical disc single plates shown in FIG. 2 adhered together through a desired void 7 defined between recording layers 3 faced inwardly and a center hub 8 is provided at the center of each glass substrate 1. The center hub 8 is provided to bring the optical disc on-center and/or to clamp the same when it is mounted on a disc drive unit and composed of a wear resistant material or a magnetic material excellent in wear resistance. This optical disc of the air sandwich structure is particularly suitable for an optical disc having a write once type recording layer.

Figure 7:
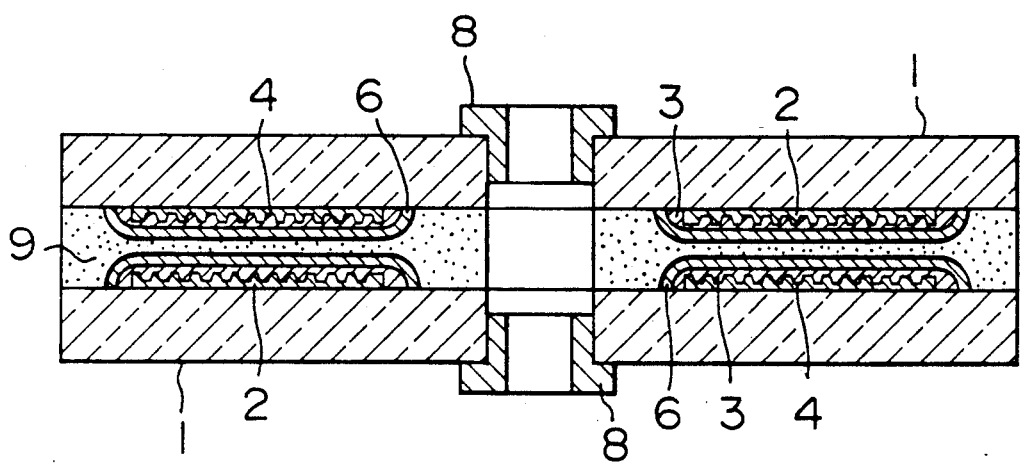
FIG. 7 is a cross sectional view of an optical disc having a closely adhered structure.

FIG. 7 shows an optical disc of a so-called close adhesion structure using the optical disc composed of a glass substrate provided with a mixed layer in which the metallic tin or tin compound is mixed. The optical disc comprises the two optical disc single plates shown in FIG. 5 adhered together through a desired adhesive layer 9 defined between recording layers 3 faced inwardly and a center hub 8 is provided at the center of each transparent glass substrate 1. This optical disc of the closely adhered structure is particularly suitable for an optical disc having an magneto-optical type recording layer.

Figure 8:
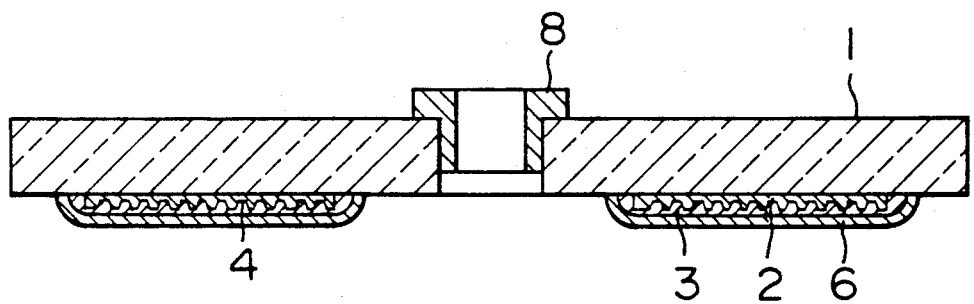
FIG. 8 is a cross sectional view of an optical disc having a single plate structure.

Further, FIG. 8 shows an optical disc of a so-called single plate structure using an optical disc composed of a glass substrate with a mixed layer in which the metallic tin or tin compound is mixed. The optical disc comprises an optical disc single plate shown in FIG. 5 with a center hub 8 being provided at the center of a transparent substrate 1. This optical disc is particularly suitable for an optical disc provided with a magneto-optical type recording layer or an optical disc solely for reproduction provided with a reflecting layer in place of the recording layer.

Conventional examples of an optical disc made using a glass substrate produced by the float method whose content of tin in the tin containing surface thereof was not yet regulated were used as comparative examples, and the comparative examples and the examples of the present invention shown in FIGS. 6, 7 and 8 were compared with respect to the number of glass plates thereof which are broken after fabrication, which are shown in Table 2. No glass plate of the examples of the present invention was broken.

TABLE 2

|  | Number of Broken Discs out of 100 pieces of Fabricated Ones | | |
|---|---|---|---|
|  | Air Sandwich Type (p'cs) | Close Adhesion Type (p'cs) | Single Plate (p'cs) |
| Articles of the Present Invention | 0 | 0 | 0 |
| Articles of Prior Art | 10 | 8 | 0 |

We claim:

1. An optical data recording medium comprising at least one glass substrate and at least one recording layer carried by at least one of said glass substrate, each said glass substrate being composed of a glass plate, said glass plate including a first and a second surface, at least one of said first and second surfaces having a surface layer containing metallic tin or a tin compound said surface layer extending from said at least one of said first and second surfaces inward toward the center of said glass plate, the content of the metallic tin or tin compound in said surface layer adjacent said at least one of said first and second surfaces being regulated by polishing to be no more than 1.3 wt % of 1 cm$^2$ ×1 micron meter thick of said surface layer, and said glass plate being treated by a chemically reinforcing treatment.

2. The optical data recording medium according to claim 1, wherein said chemically reinforcing treatment is an ion exchange method of alkali ions.

3. The optical data recording medium according to claim 1, further comprising a transfer layer of a preformat pattern composed of photo curing resin, said transfer layer being interposed between said glass substrate and said recording layer.

4. The optical data recording medium according to claim 1, wherein said glass plate further includes a preformat pattern, said pattern being etched on one of said first and second surfaces, and said recording layer is carried on the surface where said preformat pattern is etched.

5. The optical data recording medium according to claim 1, wherein there are tow glass substrates, said two glass substrates being adhered together such that said first surfaces are in confronting relationship with a void being defined therebetween, one of said at least one recording layer being disposed on at least one of said first surfaces.

6. The optical data recording medium according to claim 1, wherein there are two glass substrates, said two glass substrates being adhered together such that said first surfaces are in confronting relationship with an adhesive layer being formed therebetween, one of said at least one recording layer being disposed on at least one of said first surfaces.

7. The optical data recording medium according to claim 1, wherein said glass substrate is formed to a disc shape.

8. The optical data recording medium according to claim 1, wherein a center hub for centering and/or clamping is provided at the center of said glass substrate.

9. The optical data recording medium according to claim 1, wherein said glass substrate is formed to a card shape.

10. An optical data recording medium comprising at least one glass substrate and at least one recording layer carried by said at least one glass substrate, each said glass substrate being composed of a glass plate, said glass plate including a first surface and a second surface, wherein said glass plate is made by the float method and at least said first surface of said first and second surfaces contains metallic tin or tin compound, the content of metallic tin or tin compound in said first surface being larger than in said second surface, said at least first surface of said first and second surfaces being polished, and both said first surface and said second surface being treated by a chemically reinforcing treatment, said treatment being an ion exchange method of alkali ions.

11. A method of manufacturing an optical data recording medium provided with a glass substrate and a recording layer carried by the glass substrate, comprising the steps of making a glass plate by a float method using melted metallic tin, cutting said glass plate to a desired configuration and size, polishing at least one surface of said glass plate which was in contact with the melted metallic tin when making said glass plate to regulate the content of tin in the polished surface to be no more than 1.3 wt. % of 1 cm$^2$×1 micron meter thick of the polished surface, and subjecting said polished glass plate to a chemically reinforcing treatment.

12. The method of manufacturing an optical data recording medium according to claim 11, wherein said polishing includes removing no less than 3 micron meters from said at least one surface.

* * * * *